VAN DUINE & DE JONGE.
Plow Attachment.

No. 111,155.

Patented Jan. 24, 1871.

UNITED STATES PATENT OFFICE.

MARINUS VAN DUINE AND JAN DE JONGE, OF ZEELAND, MICHIGAN.

IMPROVEMENT IN MANURE-RAKE ATTACHMENTS FOR PLOWS.

Specification forming part of Letters Patent No. 111,155, dated January 24, 1871.

*To all whom it may concern:*

Be it known that we, MARINUS VAN DUINE and JAN DE JONGE, of Zeeland, in the county of Ottawa and State of Michigan, have invented a new and useful Improvement in Rotating Manure-Rake Attachments to Plows; and we do declare that the following is a true and accurate description thereof, reference being had to the accompanying drawings, and to the letters of reference marked thereon, and being a part of this specification, in which—

Figure 1:
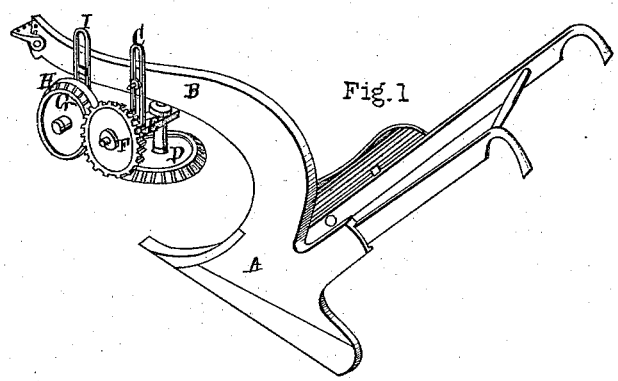
Figure 2:
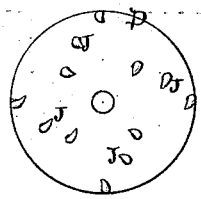

Figure 1 shows our invention in perspective, as attached to a plow; Fig. 2, a plan view of the bottom of a rotating rake.

Like letters refer to like parts in each figure.

The nature of this invention relates to the attachment of one or more rotating rakes to the beam of a plow, in front of the point, in such a manner that it or they will rake into the furrow, while plowing is being done, straw, green or long manure, &c., which it is desired to plow or turn over.

The invention consists in the peculiar construction and arrangement of a vertically-adjustable revolving rake, and of the mechanism by which motion is imparted to said rake, and its connection with a plow, all as and for the purposes hereinafter set forth.

In the accompanying drawings, A represents a plow of ordinary construction, to the beam B of which is secured by the adjustable hanger C the rotating rake D. This rake is properly journaled in the bearing E, which is supported by the hanger C, which is adjustable, as shown, that the rake may be made to run at any desired distance beneath the beam, and in accordance with the depth of the furrow being plowed. The upper rim of the rake is provided with teeth, as shown, which engage with the gear-wheel F, which in turn mesh into and derive motion from a pinion, G, on the plow-wheel H, which is secured to the plow-beam B in the usual manner with an adjustable clevis, I. The forward motion of the wheel H gives motion to the wheel F and the rake, and compels the latter to rotate whenever the wheel H is in motion, and thereby throws the straw, weeds, and long manure into the furrow, where it is thoroughly covered by the turning of the next furrow. The rake has four series, or more, of teeth, J, projecting from its lower face, as shown in Fig. 2, and in relation to each series and to the axis of the rake, as fully shown, for the purpose above described.

What we claim as our invention, and desire to secure by Letters Patent, is—

The rake D, in combination with the wheels F and H, hangers I and C, and bearing E, and connected to the beam B of the plow A, all constructed substantially as described and shown, and arranged to operate as and for the purposee set forth.

MARINUS VAN DUINE.
JAN DE JONGE.

Witnesses:
C. VAN KOEVERNIGE,
J. P. DE PREE.